United States Patent [19]

Kullmann

[11] 4,216,398

[45] Aug. 5, 1980

[54] ARRANGEMENT FOR COOLING AN ELECTRIC MACHINE

[75] Inventor: Dieter Kullmann, Langenzenn, Fed. Rep. of Germany

[73] Assignee: Siemens Aktiengesellschaft, Munich, Fed. Rep. of Germany

[21] Appl. No.: 627,215

[22] Filed: Oct. 30, 1975

[30] Foreign Application Priority Data

Nov. 8, 1974 [DE] Fed. Rep. of Germany ....... 2453182

[51] Int. Cl.² .............................................. H02K 9/00
[52] U.S. Cl. ...................................... 310/53; 62/505
[58] Field of Search ............ 310/10, 40, 52, 53, 310/54, 64, 165, 194; 62/505

[56] References Cited

U.S. PATENT DOCUMENTS

| 2,675,493 | 4/1954 | Grobel | 310/53 |
| 2,970,232 | 1/1961 | Kilbourne | 310/53 |
| 2,975,308 | 3/1961 | Kilbourne | 310/53 |
| 3,470,396 | 9/1969 | Kafka | 310/10 |
| 3,626,717 | 12/1971 | Lorch | 62/505 |
| 3,644,766 | 2/1972 | Hughes | 310/40 |
| 3,657,580 | 4/1972 | Doyle | 310/10 |
| 3,679,920 | 7/1972 | MacNab | 310/52 |
| 3,711,731 | 1/1973 | Pluschke | 310/53 |
| 3,761,752 | 9/1973 | Anderson | 310/194 |
| 3,816,780 | 6/1974 | Smith | 310/52 |
| 3,904,901 | 9/1975 | Renard | 310/52 |
| 3,922,573 | 11/1975 | Pluschke | 310/53 |
| 3,934,163 | 1/1976 | Mailfert | 310/10 |
| 3,940,643 | 2/1976 | Sika | 310/52 |
| 3,942,053 | 3/1976 | Abolins | 310/10 |

Primary Examiner—R. Skudy
Attorney, Agent, or Firm—Kenyon & Kenyon

[57] ABSTRACT

An arrangement for cooling an electric machine such as a turbo generator having a rotor with an excitation winding which must be cooled to a low temperature, the excitation winding concentrically surrounded by a cooled damper winding in which separate cooling loops are provided for cooling the excitation winding, the damper winding and the current supply and/or discharge lines to permit the refrigeration power necessary to remove losses to be adapted to the actual losses in the machine and to be kept relatively small.

7 Claims, 2 Drawing Figures

ARRANGEMENT FOR COOLING AN ELECTRIC MACHINE

BACKGROUND OF THE INVENTION

This invention relates to electric machines in general and more particularly to electric machines having rotors containing excitation windings which are cooled to a low temperature.

The use of deeply cooled windings, in particular superconducting windings, in electric machines permits a substantial increase of induction in the air gap between the rotating machine part, normally referred to as the rotor, and the stationary machine part, normally referred to as the stator. In particular, it is possible to obtain higher induction with what are known as high field superconductors even without the use of magnetic iron and in a manner permitting the excitation winding to operate almost without losses since very high current densities can be provided in such superconductors. Since no magnetic iron is required, the ampere turns in the stator windings, which are normally conducting, can also be increased considerably while staying within the same machine dimensions. Thus, in a machine using superconducting excitation windings, the ratio of power rating to volume and weight is considerably higher than in a machine of conventional design. Typically the rotor body is a hollow cylinder of non-magnetic material having slots for receiving the excitation winding. The conductors will be, for example, niobium-titanium multi-filiment conductors with a copper or copper nickel matrix for stabilization. The ends of the conductors are connected to current supply and discharge lines which are normally conducting and which supply the required energy to the excitation windings from the outside, i.e. from equipment at room temperature. Thus, it is only the conductors themselves which are cooled to a superconducting temperature. However, to reduce thermal losses due to due to heat influx, cooling is generally provided for the current supply and discharge lines. Surrounding the rotor concentrically is a co-rotating damper winding of copper, for example, which is also kept at a lower temperature of, for example, 80 K. This winding is used both to protect the superconducting excitation winding from alternating magnetic fields and also to reduce the radiated heat.

An a.c. synchronous machine installation having a rotor with superconducting excitation windings which can be maintained in a superconducting state using a cryogenic medium such as liquid helium is described in Swiss Pat. No. 516,250. In the disclosed machine a radiation protection shield is arranged concentrically surrounding the rotor having the superconducting excitation winding. The radiation protection shield is cooled using tubes which carry a coolant such as helium, the temperature of which is below the ambient temperature. The radiation shield is also used as a damper winding in addition to its other functions.

In this reference, as shown on FIG. 4, the machine parts are cooled by a cryogenic medium compressed in a compressor and pre-cooled in a first cooling arrangement. The coolant leaves the cooling arrangement at a temperature of approximately 80 K. and flows to a further cooling stage arranged in the rotor shaft. In this stage the cooling medium is cooled further to a temperature at which superconduction takes place in the excitation windings.

The cooling medium flows from the second cooling stage, now at a temperature of 4 K. for example, inside the rotor to the excitation winding. Part of the cryogenic medium leaving the winding is then used to pre-cool the medium conducted through the second cooling stage after which it is returned to the compressor. A second part of the cooling medium leaving the winding is first led around the second cooling stage and is then used to cool the normal conductors of the current supply and discharge lines. A portion of the cooling medium can be branched off further from the loop between the first cooling device and the second cooling stage and conducted through the tubes attached to the radiation protection shield.

In this prior art cooling arrngement, the current supply and discharge lines are cooled by the same cooling medium which has flowed through the superconducting excitation windings. As a result, cooling of the current supply and discharge lines depends on the cooling of the superconductors of the excitation winding. Since the winding losses of the superconductors can increase to an amount many times their normal value for short periods of time, e.g. in the case of a short circuit, refrigeration must be provided to remove such losses. The accompanying increase of the coolant flow rate through the excitation windings to accommodate these losses may, however, lead to an undesirable cooling of the current supply and discharge leads below that which they are designed for. This extra cooling of the ends of the current supply and discharge lines on the room temperature side may result in them falling below the dew point and may result in ice formation. As a result, a reduction in the dielectric strength of the current supply and discharge lines can occur. Furthermore, large amounts of coolant, sufficient for a peak short circuit, must always be cooled back down to the cryogenic temperature from room temperature. Since such peak short circuits seldomly occur, the cooling procedure of the prior art device is relatively uneconomical.

Thus, the need for an improved cooling device which meets all the various needs of the system but operates economically and without the danger of cooling the supply and discharge lines too much becomes evident.

SUMMARY OF THE INVENTION

The present invention provides such an improved cooling arrangement for an electric machine. In particular, it provides a system in which the refrigeration capacity is tailored to the operational needs. From the discussion above, it is apparent that the required refrigeration capacity at any time depends on the operating condition of the machine. For example, winding losses can increase to about ten times the normal losses within a few miliseconds should a short circuit occur. Although such short circuits seldom occur, and the increased losses are present only for a short period of several minutes, the cooling arrangement must be able to remove these losses without time delay and without a disturbing temperature rise in the superconductors. However, at the same time, it is not desireable to have equipment operating to supply full refrigeration capacity during normal operation when the actual losses are small. The present invention provides a system in which only the necessary capacity is provided at any time. The illustrated arrangement is directed to cooling an electric machine, particularly a turbo generator of the type mentioned above. The object of the present invention is accomplished by providing separate cooling loops for the excitation winding, the damper winding and the current supply and/or discharge lines respectively.

Through this arrangement a number of advantages are obtained. The amount of coolant circulated in each of the individual loops can be selected so that temperature increases in the deeply cooled, e.g. superconducting, conductors will remain sufficiently small even for maximum dissipation losses with flow and pump losses within permissable limits. At the same time, extra cooling does not take place when not needed.

In accordance with a further feature of the present invention, a heat exchanger is provided which permits the cryogenic medium circulated in the excitation winding loop to transfer the winding and pump losses along with flow losses to a coolant bath. The coolant bath is arranged so that its temperature can be adjusted, for example, by changing its vapor pressure. This permits the temperature of the excitation winding to be kept constant below a predetermined value, independent of any variations in the operating condition of the machine.

DETAILED DESCRIPTION OF THE PREFERRED EMBODIMENT

Figure 1:
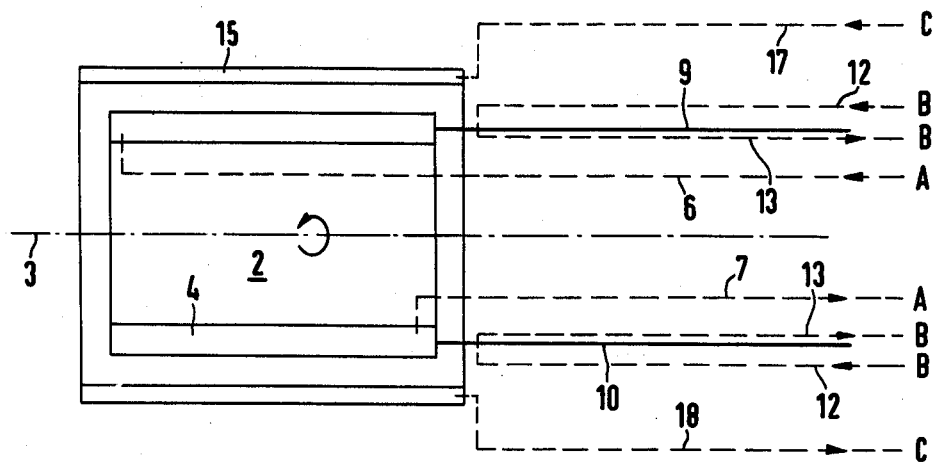
FIG. 1 is a schematic illustration of the rotor of an electric machine surrounded by a damper winding illustrating the separate cooling loops of the present invention.

FIG. 1 schematically illustrates the rotor body of a generator such as synchronous a.c. generator with cooling supplied thereto. The rotor body 2 is supported concentrically about an axis of rotation 3. It is a deeply cooled rotor such a superconducting rotor of the type described above and, thus, includes a deeply cooled excitation winding 4 arranged in slots on the inside or outside of a support body. Typically the conductors in the winding will contain superconductive material. A cooling or cryogenic medium A is used to maintain the superconductors in the superconducting state. The cryogenic medium A may be, for example, liquid helium with a temperature of 3.5 K. It is fed into the winding 4 through a supply line 6 at one end face of the winding with a pressure of, for example, 2 bar [200 kPa] flows through cavities provided for cooling the winding 4 and leaves the winding at the opposite end face through a discharge line 7. At the time of leaving the winding it will typically have a temperature of 3.7 K. and a pressure of 1.9 bar [190 kPa]. In order to supply electrical energy to the winding 4, a current supply line 9 and a current discharge line 10 are provided. The deeply cooled winding 4 is connected to an external current supply device which is at room temperature [not shown in the drawing] through these current leads 9 and 10. In order to reduce the inflow of heat from the current leads 9 and 10, an additional cooling loop, separate from the loop associated with the cryogenic medium A is provided. In this loop a cooling medium B which will, for example, have a temperature of 4 K. is fed through a coolant line 12 to the current leads at the end on the low temperature side. i.e. at the end connected to the winding 4. The coolant B then flows in a space 13 along the lines 9 and 10 toward their warm end and in the process is warmed up, ideally to the temperature of the conductor at the point where it leaves the conductors, e.g. to room temperature.

Surrounding the deeply cooled winding 4 of the rotor body 2 concentrically at a predetermined distance is a damper winding 15, typically a copper shield. It is to advantage that the damper winding be kept at a temperature between room temperature and the low temperature of the winding 4 using a further cooling medium C. A suitable coolant for this purpose is liquid nitrogen at a temperature of 78 K. Alternatively, helium gas at a temperature of approximately 100 K. or below can also be used. It is preferred that a coolant loop separate from of the cryogenic medium A and the cooling medium B be provided for this purpose. Shown on the figure is a line 17 supplying the cooling medium C to the damper winding 15 and an outlet line 18 acting as a return line. Typically, the coolant will flow through a tubing system such as copper tube soldered to the copper shield.

The flow direction of each of the coolants A, B and C in their respective loops, separate from each other, is also indicated on the figure with arrows.

Figure 2:
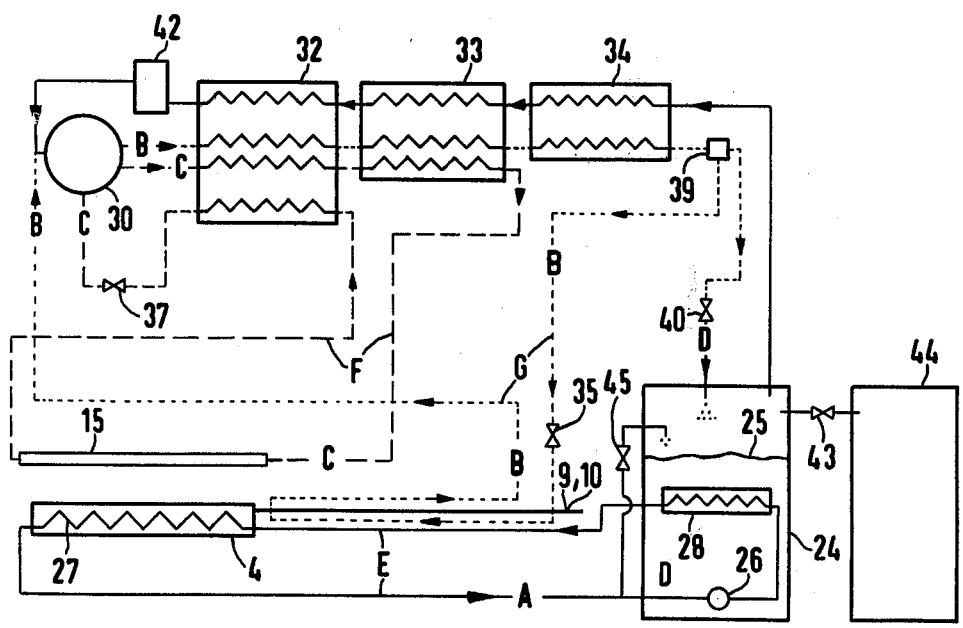
FIG. 2 is a block diagram illustrating the cooling arrangement used to supply the cooling loops of FIG. 1.

FIG. 2 illustrates a system for supplying coolant to various loops. It is a system which may be used, for example, with an arrangement such as of FIG. 1. In essence, there are three separate cooling loops designated on the figure by E, F and G. The cooling loop E is shown in solid lines and cools the excitation winding 4, not shown in detail in the figure. The cooling loop F is provided for cooling the damper winding 15 and is shown in dashed lines. The cooling loop G, shown in dotted lines, cools the current leads feeding electrical energy to the excitation windings. These two are shown combined on one line as 9, 10 for purposes of simplicity.

Associated with the cooling loop E for cooling the excitation windings of the rotor is a cryostat 24. In the cryostat 24 there is a bath 25 of a cryogenic medium D. e.g. this can be a helium bath at a temperature of 3.3 K. and a pressure of 0.4 bar [40 kPa]. The cooling loop E containing the cryogenic medium A is led through the bath 25. The cryogenic medium A is fed to the cavities in the excitation winding 4 using a pump 26 arranged in cryostat 24. On the figure the cavities in the excitation winding 4 which is to be deeply cooled are shown as a coil of tubing 27. Typically, the medium A is fed at a temperature of 3.5 K. as indicated above. After flowing through the winding 4 it leaves with a temperature of approximately 3.7 K. and is then conducted through a heat exchanger 28 also located in the low temperature bath 25 of cryogenic medium D contained within the cryostat 24. The heat absorbed by the cryogenic medium A in the cooling loop of the winding is given off to the bath 25 in the cryostat 24 by means of the heat exchanger 28.

In conventional fashion, the cooling loop E can be filled with cryogenic medium A from the outside by means of a separate feeding line which can be shut off. This also permits makeup for any losses. For sake of simplicity, this separate line for charging the loop E is not shown.

To cool the current leads 9 and 10 the cooling loop G is used. It carries a cooling medium B which is compressed at room temperature in a compressor 30 and then conducted through several heat exchangers and, depending on the specific system, expansion machines, i.e. typical refrigeration equipment. After being throttled in a valve 35, the coolant B is then fed into the current leads 9 or 10 at the end connected to the excitation winding 4 at the desired load temperature, for example, 4.2 K. The amount of cooling medium and its flow rate is controlled so that while flowing through the current leads it is warmed up to approximately room temperature. The coolant now at room temperature is fed back to the compressor and continues in the closed loop described.

The coolant C for cooling the damper windings 15 flows in the cooling loop F. It is also compressed in the compressor 30 and then cooled to a temperature between the low temperature of the winding and the external room temperature, e.g. to a temperature of 40 K. To accomplish this, the coolant C is conducted through the two heat exchangers 32 and 33 from which it enters the damper winding 15. It leaves the damper winding with increased temperature of, for example, 100 K. and is conducted through the first heat exchanger 32 again before being returned to the compressor 30, after being throttled in a valve 37.

The embodiment of FIG. 2 assumes that the cooling loops F and G are separate from each other. The compressor 30 will include independent compression stages for each of the coolants C and B. It is possible, however, to conduct the cooling loops F and G through the compressor 30 and heat exchanges 32 and 33 on a common line, if the same cryogenic medium is provided for the coolants C and B. There can then be a branch provided after the second heat exchanger 33 with one branch going to the damper winding and the other through the additional heat exchanger to the current leads 9 and 10. This still provides separate cooling loops in accordance with the present invention.

It is also of advantage to provide a branching point 39 after the heat exchanger 34 and ahead of the throttle valve 35. This permits part of the coolant B to be taken from the coolant loop G and further cooled by passage through the throttle valve 40 the point where it is liquified. The liquified coolant designated as D is then conducted into the cryostat 24 to replenish the low temperature bath 25. The portion of the coolant D in the cryostat 24 which evaporates will preferably be conducted through the heat exchangers 34, 33 and 32 and introduced into the flow, which is at room temperature, of the coolant B by means of a blower 42 installed ahead of the compressor 30.

The arrangement for cooling turbo genertor according to the present invention, thus, constitutes a system of three cooling loops separate from each other. There is a cold loop E for exclusive cooling of the winding, the coolant flow rate of which can be adapted, by means of the pump 26, to supply the largest expected losses in the winding. A further loop G which starts out cold and becomes warm is provided for cooling the current leads 9 and 10. Finally, a cooling loop F is provided for removing the damper winding losses and the heat introduced from the outside. The coolant C in the loop F along with its input and output temperatures as well as the coolant used can be freely selected and thus can be optimized, for example, with respect to minimum operating and investment costs of the required refrigeration machinery as well as to provide greater operating safety for the generator.

In the disclosed system if a peak short circuit or an in-rush of current occurs, rapid changes of heat disspation occur in the damper winding. However, the temporary temperature changes resulting therefrom are of secondary importance with regard to the behavior of the generator, with the cooling throughput remaining constant.

However, the temperature stability of the excitation winding 4 is of decisive importance to the functioning of the generator. That is to say, this winding cannot be allowed to be warmed up. In comparison to the cooling principles for deeply cooled excitation windings which were previously used, the cooling loop E of the present invention has its major advantage that the circulated quantity of cryogenic medium A can be chosen to be large enough, with tolerable flow and pump losses, that the temperature increases of the deep cooled conductors, particularly the superconductors, remain sufficiently small even for large dissipated power. Furthermore, the removed winding losses are transferred to a low temperature cooling bath, the temperature which is really adjustable by changing vapor pressure. Thus, the temperature of the winding can also be influenced in a simple manner. In order to generate temperatures below 4.2 K. in the low temperature helium bath 25 in the cryostat 24, a blower 42 which is adapted to the normal winding losses of the excitation winding 4 is sufficient. Suddenly occurring increases in loss of short duration can be stored using the heat capacity of the cold loop E and the low temperature bath 25.

In addition, the vapor pressure of the low temperature 25 can be lowed in the event of a peak short circuit by using an evacuated buffer tank 44 which can be brought into play using a valve 43. The amount of heat introduced into the low temperature bath 25 from the peak short circuit can then be, at least, partially compensated. Through the use of a supplemental blower, not shown on the figure, the heat capacity increases of the low temperature bath connected therewith can then again be reduced slowly.

In addition, provision can be made in the cooling system such that the cooling medium A in the cooling loop E for the excitation winding 4 escapes for the cooling loop E automatically through an overpressure valve 45, particularly in the event that the excitation winding goes into a normally conducting state, i.e. for large temperature and pressure increases of the cryogenic medium A. The escaping cryogenic medium is then advantageously conducted into the cryostat 24.

Thus, an improved cooling system for an electric machine such a turbo generator has been shown. Although specific embodiments have been illustrated and described, it will be obvious to those skilled in the art that various modifications may be made without departing from the spirit of the invention which is intended to be limited solely by the appended claims.

I claim:

1. In an arrangement for cooling an electric machine such as a turbo generator which has a rotor with a superconducting excitation winding to be cooled to a low temperature, a cooled damping winding concentrically surrounding said rotor excitation winding with the excitation winding coupled to cooled current and supply discharge lines, the improvement comprising:
   (a) a first, separate cooling loop for only the rotor excitation winding, containing a cooling medium therein;
   (b) a second cooling loop supplying only the current supply and discharge lines;
   (c) a third cooling loop for the damping winding;
   (d) a cryostat having a low temperature bath containing a coolant;
   (e) the cooling medium in said first cooling loop being a cryogenic medium and said cooling loop including a heat exchanger disposed in said low temperature bath; and (f) at least a portion of evaporated coolant from said low temperature bath being used for supplying at least one of said second and third cooling loops.

2. Apparatus according to claim 1 and further comprising means maintained at a low temperature in said first cooling loop for circulating the cooling medium therein through said loop.

3. Apparatus according to claim 1 wherein the cryogenic medium in said first loop is helium.

4. Apparatus according to claim 1 wherein said second and third cooling loops have at least a portion is common.

5. Apparatus according to claim 1 wherein the cryogenic media in said first, second and third cooling loops and said cooling medium in said low temperature bath are helium.

6. In an arrangement for cooling an electric machine such as a turbo generator which has a rotor with an excitation winding to be cooled to a low temperature, a cooled damping winding concentrically surrounding said rotor excitation winding, with the excitation winding coupled to cooled current and supply discharge lines, the improvement comprising:

(a) a first separate cooling loop for only the rotor excitation winding, containing a cooling medium therein;

(b) at least a second cooling loop for the current supply and discharge lines;

(c) a cryostat having a low temperature bath containing a coolant;

(d) the cooling medium in said first cooling loop being a cryogenic medium and said cooling loop including a heat exchanger disposed in said low temperature bath; and (e) a blower having an input coupled to said cryostat to exhaust gas evaporated from said low temperature bath, said blower having a capacity of exhausting only the amount of gas resulting from winding losses during normal operation of the excitation winding.

7. In an arrangement for cooling an electric machine such as a turbo generator which has a rotor with an excitation winding to be cooled to a low temperature, a cooled damping winding concentrically surrounding said rotor excitation winding, with the excitation winding coupled to cooled current and supply discharge lines, the improvement comprising:

(a) a first separate cooling loop for only the rotor excitation winding, containing a cooling medium therein;

(b) at least a second cooling loop for the current supply and discharge lines;

(c) a cryostat having a low temperature bath containing a coolant;

(d) the cooling medium in said first cooling loop being a cryogenic medium and said cooling loop including a heat exchanger disposed in said low temperature bath;

(e) an evacuated buffer tank; and (f) means for selectively coupling said buffer tank to said cryostat to exhaust evaporated gas from said low temperature bath.

* * * * *

UNITED STATES PATENT AND TRADEMARK OFFICE
CERTIFICATE OF CORRECTION

PATENT NO. : 4,216,398
DATED : August 5, 1980
INVENTOR(S) : Dieter Kullmann

It is certified that error appears in the above—identified patent and that said Letters Patent is hereby corrected as shown below:

Column 6, lines 57-58, change "current and supply discharge lines" to --current supply and discharge lines--.

Column 7, lines 25-26, change "current and supply discharge lines" to --current supply and discharge lines--.

Column 8, lines 16-17, change "current and supply discharge lines" to --current supply and discharge lines--.

Column 1, line 40, delete "due to" second occurrence.

Column 2, line 54, change "miliseconds" to --milliseconds--.

Signed and Sealed this

Eleventh Day of November 1980

[SEAL]

Attest:

SIDNEY A. DIAMOND

*Attesting Officer*  *Commissioner of Patents and Trademarks*